(12) United States Patent
Ravasz et al.

(10) Patent No.: US 11,086,406 B1
(45) Date of Patent: Aug. 10, 2021

(54) THREE-STATE GESTURE VIRTUAL CONTROLS

(71) Applicant: Facebook Technologies, LLC, Menlo Park, CA (US)

(72) Inventors: Jonathan Ravasz, London (GB); Etienne Pinchon, London (GB); Adam Varga, London (GB); Jasper Stevens, London (GB); Robert Ellis, London (GB); Jonah Jones, London (GB)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/578,240

(22) Filed: Sep. 20, 2019

(51) Int. Cl.
*G06F 3/01* (2006.01)
*G06F 3/0484* (2013.01)

(52) U.S. Cl.
CPC .......... *G06F 3/017* (2013.01); *G06F 3/04842* (2013.01)

(58) Field of Classification Search
CPC .............................. G06F 3/017; G06F 3/04842
See application file for complete search history.

(56) References Cited

U.S. PATENT DOCUMENTS

| | | | |
|---|---|---|---|
| 6,842,175 | B1 | 1/2005 | Schmalstieg et al. |
| 7,701,439 | B2 | 4/2010 | Hillis et al. |
| 8,558,759 | B1 | 10/2013 | Prada Gomez et al. |
| 8,947,351 | B1 | 2/2015 | Noble |
| 9,117,274 | B2 | 8/2015 | Liao et al. |
| 9,292,089 | B1 | 3/2016 | Sadek |
| 9,477,368 | B1 | 10/2016 | Filip et al. |
| 9,817,472 | B2 | 11/2017 | Lee et al. |
| 10,220,303 | B1 | 3/2019 | Schmidt et al. |
| 10,248,284 | B2 | 4/2019 | Itani et al. |
| 10,473,935 | B1 | 11/2019 | Gribetz et al. |
| 10,521,944 | B2 | 12/2019 | Sareen et al. |

(Continued)

FOREIGN PATENT DOCUMENTS

WO     2018235371 A1     12/2018

OTHER PUBLICATIONS

Hincapie-Ramos, J.D. et al. "GyroWand: IMU-based raycasting for augmented reality head-mounted displays." Proceedings of the 3rd ACM Symposium on Spatial User Interaction, Aug. 2015, pp. 89-98.

(Continued)

*Primary Examiner* — Hong Zhou
(74) *Attorney, Agent, or Firm* — Potomac Law Group, PLLC

(57) ABSTRACT

A hand interaction system can use a three-state model to differentiate between normal hand movements, such as reaching for an object, and hand input gestures. The three-state model can specify a sequence of states including: 1) a neutral state, 2) a tracking state, and 3) an active state. In the neutral state, the hand interaction system monitors for a gesture signaling a transition to the tracking state but does not otherwise interpret a gesture corresponding to the active state as input. Once a gesture causes a transition to the intermediate tracking state, the hand interaction system can recognize a further active state transition gesture, allowing active state interaction. Thus, the monitoring for the intermediate tracking state provides a gating mechanism, making it less likely that the hand interaction system will interpret hand movements as input when not so intended by the user.

20 Claims, 12 Drawing Sheets

(56) References Cited

U.S. PATENT DOCUMENTS

| | | |
|---|---|---|
| 2008/0089587 A1* | 4/2008 | Kim ............... G06F 3/04815 382/190 |
| 2010/0306716 A1 | 12/2010 | Perez |
| 2011/0267265 A1 | 11/2011 | Stinson |
| 2012/0069168 A1* | 3/2012 | Huang ............... H04N 21/4223 348/77 |
| 2012/0143358 A1 | 6/2012 | Adams et al. |
| 2012/0188279 A1 | 7/2012 | Demaine |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0063345 A1 | 3/2013 | Maeda |
| 2013/0125066 A1 | 5/2013 | Klein et al. |
| 2013/0147793 A1 | 6/2013 | Jeon et al. |
| 2013/0265220 A1 | 10/2013 | Fleischmann et al. |
| 2014/0125598 A1 | 5/2014 | Cheng et al. |
| 2014/0236996 A1 | 8/2014 | Masuko et al. |
| 2014/0357366 A1 | 12/2014 | Koganezawa et al. |
| 2014/0375691 A1 | 12/2014 | Kasahara |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0153833 A1* | 6/2015 | Pinault ............... G06F 3/017 345/156 |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0261659 A1* | 9/2015 | Bader ............... G06F 3/017 717/125 |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0378291 A1 | 12/2016 | Pokrzywka |
| 2017/0060230 A1 | 3/2017 | Faaborg et al. |
| 2017/0109936 A1 | 4/2017 | Powderly et al. |
| 2017/0139478 A1 | 5/2017 | Jeon et al. |
| 2017/0192513 A1* | 7/2017 | Karmon ............... G06K 9/00389 |
| 2017/0262063 A1* | 9/2017 | Blenessy ............... G06F 3/04842 |
| 2017/0278304 A1 | 9/2017 | Hildreth et al. |
| 2017/0287225 A1 | 10/2017 | Powderly et al. |
| 2017/0296363 A1* | 10/2017 | Yetkin ............... G06F 1/163 |
| 2017/0364198 A1 | 12/2017 | Yoganandan et al. |
| 2018/0059901 A1 | 3/2018 | Gullicksen |
| 2018/0107278 A1 | 4/2018 | Goel et al. |
| 2018/0113599 A1 | 4/2018 | Yin |
| 2018/0307303 A1 | 10/2018 | Powderly et al. |
| 2018/0322701 A1 | 11/2018 | Pahud et al. |
| 2018/0335925 A1 | 11/2018 | Hsiao et al. |
| 2018/0357780 A1 | 12/2018 | Young et al. |
| 2019/0094981 A1 | 3/2019 | Bradski et al. |
| 2019/0107894 A1* | 4/2019 | Hebbalaguppe ............... G06F 3/011 |
| 2019/0213792 A1 | 7/2019 | Jakubzak et al. |
| 2019/0258318 A1 | 8/2019 | Qin et al. |
| 2019/0278376 A1* | 9/2019 | Kutliroff ............... G06F 3/04812 |
| 2019/0279424 A1 | 9/2019 | Clausen et al. |
| 2019/0286231 A1 | 9/2019 | Burns et al. |
| 2019/0362562 A1 | 11/2019 | Benson |
| 2019/0377416 A1 | 12/2019 | Alexander |
| 2020/0082629 A1 | 3/2020 | Jones et al. |
| 2020/0097077 A1 | 3/2020 | Nguyen et al. |
| 2020/0097091 A1* | 3/2020 | Chou ............... G06F 3/0304 |
| 2020/0218423 A1 | 7/2020 | Ohashi |
| 2020/0225736 A1 | 7/2020 | Schwarz et al. |
| 2020/0225758 A1* | 7/2020 | Tang ............... G06N 3/02 |
| 2020/0226814 A1 | 7/2020 | Tang et al. |

OTHER PUBLICATIONS

Schweigert, R. et al. "EyePointing: A gaze-based selection technique." Proceedings of Mensch and Computer, Sep. 8, 2019, pp. 719-723.

Mayer, S. et al. "The effect of offset correction and cursor on mid-air pointing in real and virtual environments." Proceedings of the 2018 CHI Conference on Human Factors in Computing Systems, Apr. 2018, pp. 1-13.

Olwal, A. et al. "The Flexible Pointer: An Interaction Technique for Selection in Augmented and Virtual Reality," Proceedings of ACM Symposium on User Interface Software and Technology (UIST), pp. 81-82, publication date Nov. 5, 2003.

Renner, P. et al. "Ray Casting". <www.techfak.uni-bielefeld.de/~tpfeiffe/lehre/VirtualReality/interaction/ray_casting.html> [accessed Apr. 7, 2020], 2 pages.

"Unity Gets Toolkit for Common AR/VR Interactions" <youtu.be/ZPhv4qmT9EQ> [accessed Apr. 7, 2020]. Unity XR Interaction Toolkit Preview Dec. 19, 2019.

International Search Report and Written Opinion, PCT Patent Application PCT/US2020/051763, dated Feb. 3, 2021, 11 pages.

* cited by examiner

THREE-STATE GESTURE VIRTUAL CONTROLS

CROSS-REFERENCE TO RELATED APPLICATIONS

This application is related to U.S. patent application Ser. No. 16/578,221 filed Sep. 20, 2019, titled "PROJECTION CASTING IN VIRTUAL ENVIRONMENTS;" U.S. patent application Ser. No. 16/578,236 filed Sep. 20, 2019, titled "GLOBAL AND LOCAL MODE VIRTUAL OBJECT INTERACTIONS;" U.S. patent application Ser. No. 16/578,251 filed Sep. 20, 2019, titled "PROGRESSIVE DISPLAY OF VIRTUAL OBJECTS;" and U.S. patent application Ser. No. 16/578,260 filed Sep. 20, 2019, titled "VIRTUAL INTERACTIONS AT A DISTANCE;" all of which are herein incorporated by reference in their entireties.

TECHNICAL FIELD

The present disclosure is directed to interactions in an artificial reality environment.

BACKGROUND

In an artificial reality environment, a user sees and interacts with "virtual objects," i.e., computer-generated object representations. Virtual objects can be presented, e.g., by a head-mounted display, mobile device, projection system, etc. Some systems allow users to interact with virtual objects using controllers or hand gestures. In systems that include hand tracking, images of the user's hands can be interpreted to create 3D models of the user's hands or to otherwise estimate hand postures. In some cases, machine learning models can make these estimations, taking hand images and determining a 3D model, skeletal posture, or other estimation of the user's hand positions.

In some systems, user hand gestures can perform "interactions" with virtual objects, including selecting, moving, rotating, resizing, actuating controls, changing colors or skins, defining interactions between real or virtual objects, setting virtual forces to act on virtual objects, or any other action on or change to an object that a user can imagine. In some systems, a user can also interact with real objects that exist independent of the computer system that controls the artificial reality environment. For example, a user can select a real object and add a virtual overlay to change the object's color or some other way the object is presented to the user, cause the real object to affect other virtual objects, etc. As used herein, unless otherwise specified, an "object" can be a real or virtual object.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
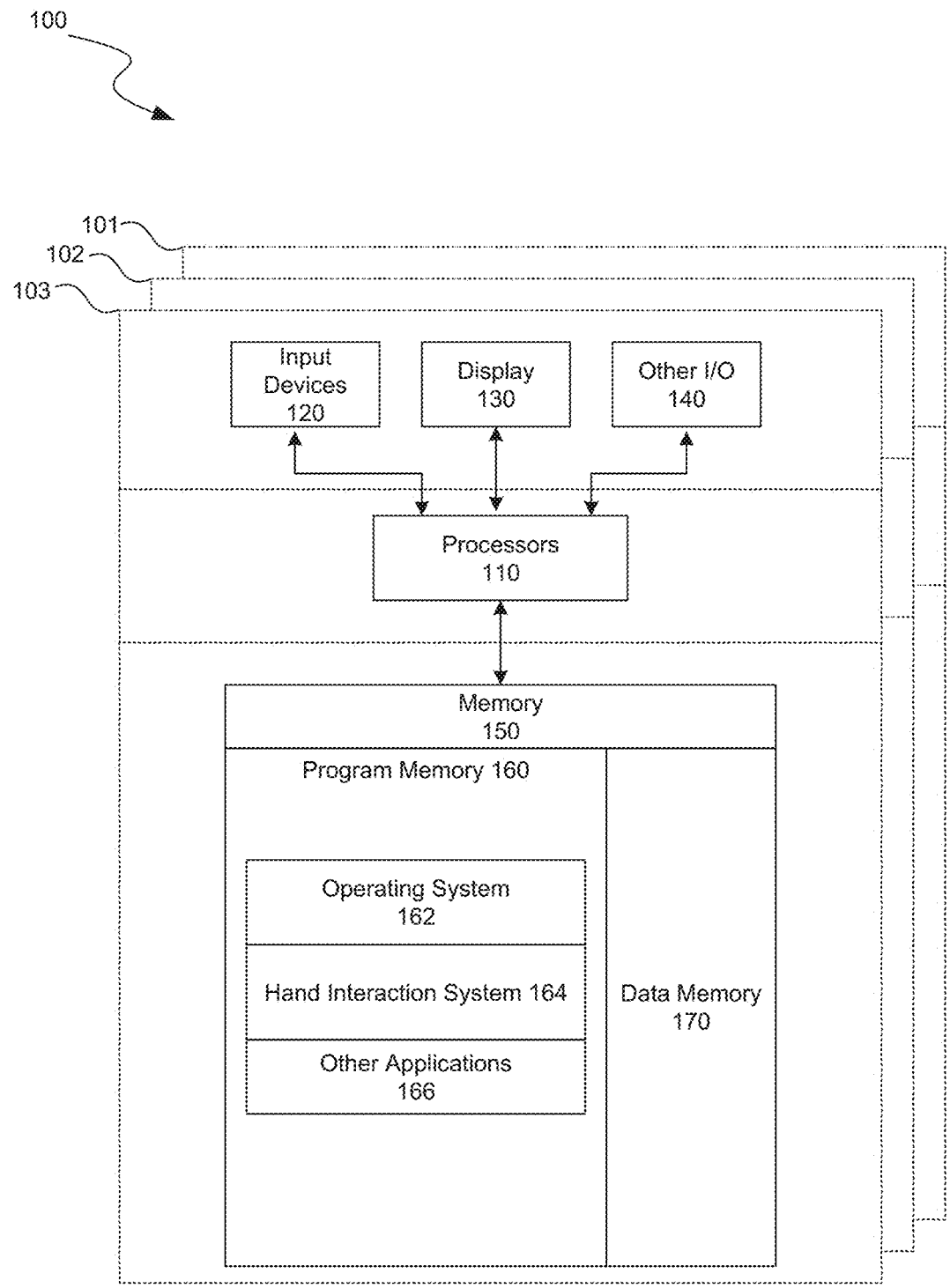
FIG. 1 is a block diagram illustrating an overview of devices on which some implementations of the present technology can operate.

Embodiments for interpreting hand gestures according to a three-state model are described herein. In existing artificial reality systems, hand gestures can be interpreted as input. However, if the user inadvertently forms an input gesture, it can cause an unintended interaction. In addition, hand tracking systems are often unable to precisely determine hand positions, resulting in incorrect determinations that a hand is making an input gesture when it is actually in a different posture. The hand interaction systems described herein can overcome these issues by using a three-state model to differentiate between normal hand movements, such as reaching for an object, and hand input gestures. The three-state model can specify a sequence of states including: 1) a neutral state, 2) a tracking state, and 3) an active state. In the neutral state, the hand interaction system monitors for a gesture signaling a transition to the tracking state but does not otherwise interpret a gesture corresponding to the active state as input. Only after the hand interaction system has identified a gesture to transition from the neutral state to the intermediate tracking state does the hand interaction system recognize a further active state transition gesture and then apply interactions in the active state. Thus, the monitoring for the intermediate tracking state provides a gating mechanism, making it less likely that the hand interaction system will interpret hand movements as input when not so intended by the user. In some implementations, a limited set of interactions such as object selection can be performed from the tracking state, and then further actions from the active state can apply to the selected objects.

The hand interaction system can manage transitions in a three-state model by tracking postures of a user's hand (e.g., based on hand images) and identifying a first transition from a neutral state to a tracking state. Once in the tracking state, the hand interaction system can identify a second transition, again based on hand posture tracking, that the hand has gone from the tracking state to an active state. In the active state, gestures can be interpreted as interacting with objects, such as by casting a projection, allowing activation of controls or other interfaces for an object, or interpreting gestures using a mapping of gestures to interactions. Projection casting is discussed in greater detail in U.S. patent application Ser. No. 16/578,236 filed Sep. 20, 2019, titled "PROJECTION CASTING IN VIRTUAL ENVIRONMENTS;" and incorporated herein by reference.

As shown below, there are different gesture sequences that the hand interaction system can identify for transitioning between neutral, tracking, and active states. Five different sets of gestures are described below in relation to FIGS. 7-11. It will be appreciated, however, that other gestures can be used and/or gestures described in the various gesture sequences in FIGS. 7-11 can paired with gestures in other sets to form different transition sequences.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

There are existing artificial reality systems for using hand gestures to interact with objects in artificial reality environments. However, these artificial reality systems are inaccurate and often mistakenly interpret hand postures as input not intended by the user. This makes existing artificial reality systems frustrating and time-consuming to operate. The hand interaction system and processes described herein overcome these problems associated with existing artificial reality systems and are expected to provide users with greater control over object interactions, offer more functionality, and decrease likelihood of misinterpretation. The artificial reality systems and processes described herein are rooted in computerized artificial reality systems, instead of being an analog of traditional object interactions. For example, existing object interaction techniques fail to provide gating features for gesture recognition, much less do they provide three-state gesture techniques whereby a set of interactions can only be accomplished in an active state after transitioning from a neutral to a tracking state. Furthermore, by using the three-state gesture techniques, the hand interaction system can save power and processing resources, as it only has to monitor for the gestures that can be activated from the current state; existing artificial reality systems have to constantly execute the additional models or comparison processes.

Several implementations are discussed below in more detail in reference to the figures. FIG. 1 is a block diagram illustrating an overview of devices on which some implementations of the disclosed technology can operate. The devices can comprise hardware components of a computing system 100 that can monitor hand postures and interpret particular gestures as transitions between neutral, tracking, and active states of a three-state model. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, hand interaction system 164, and other application programs 166. Memory 150 can also include data memory 170 that can include model states (e.g., a state machine), transition gesture identifiers (e.g., a machine learning model or sample skeleton or 3D hand models), configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
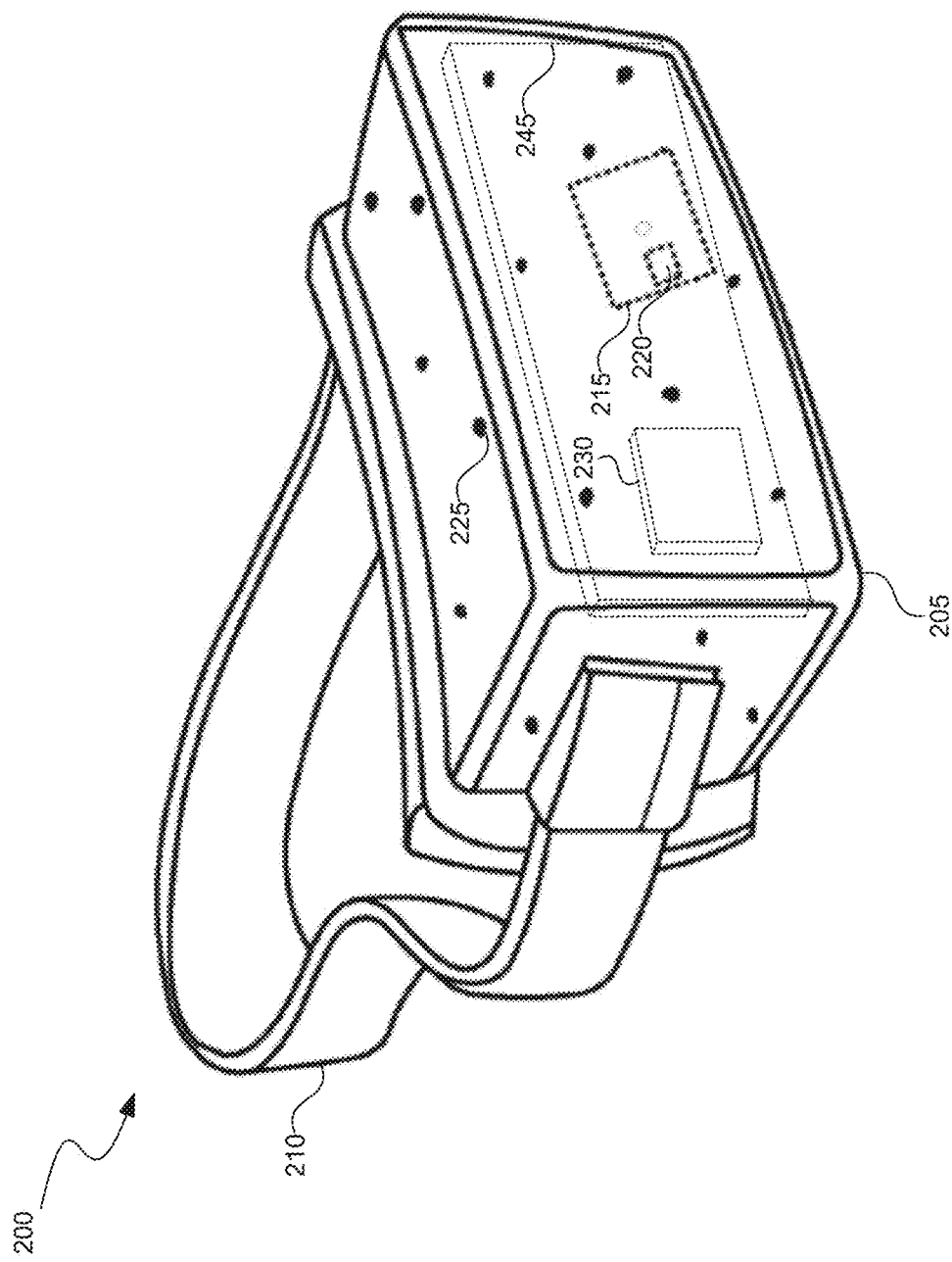
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
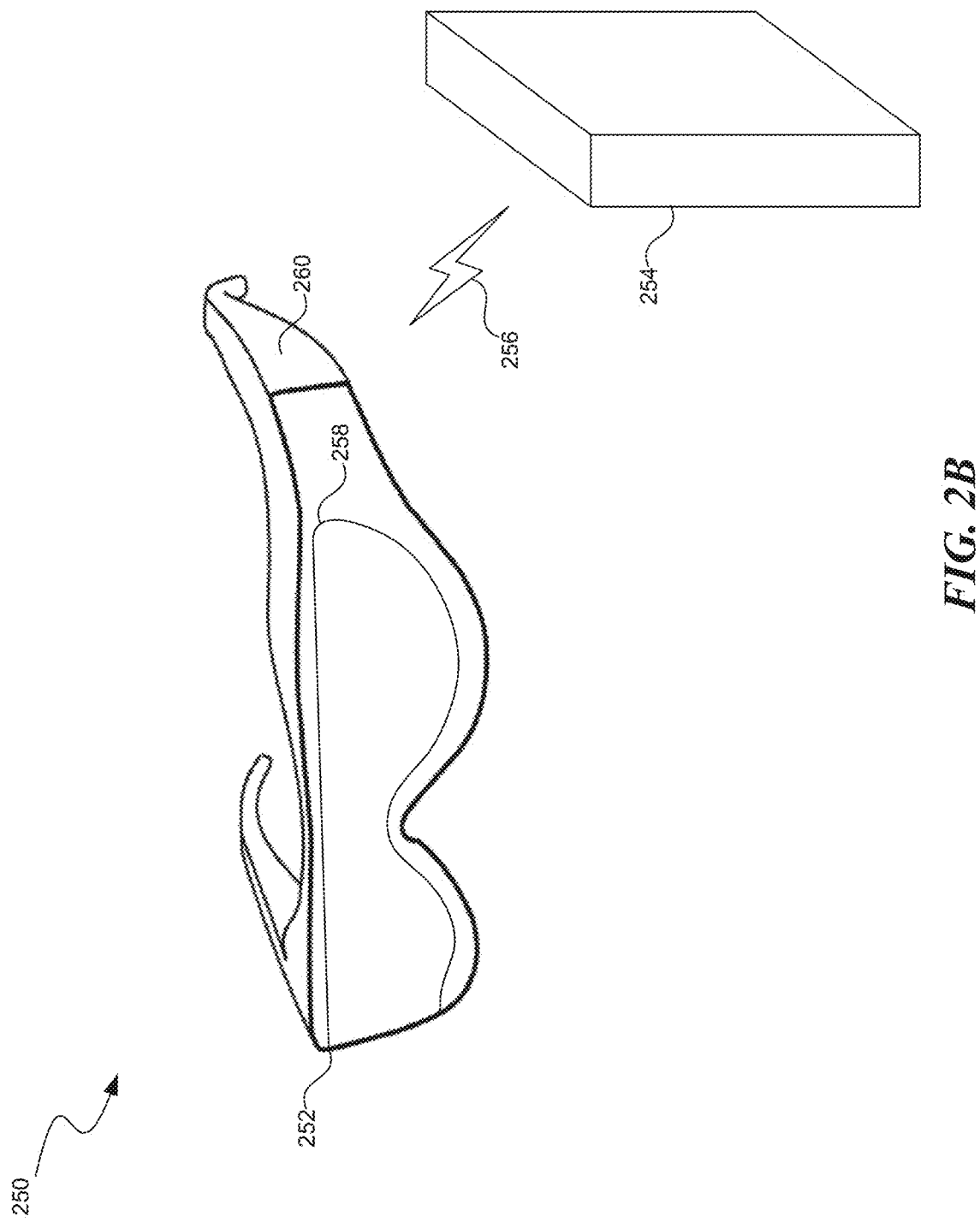
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye.

Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
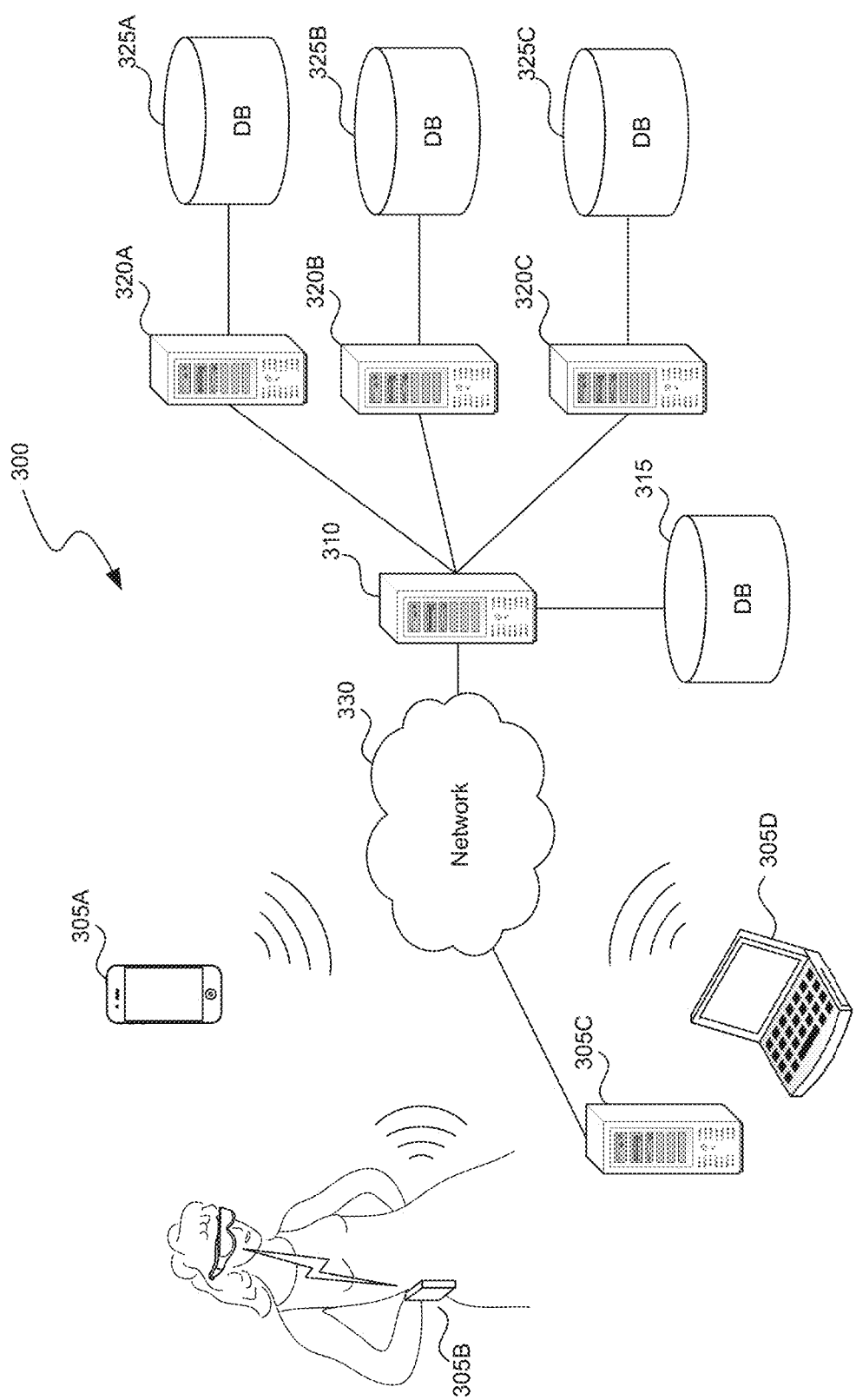
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
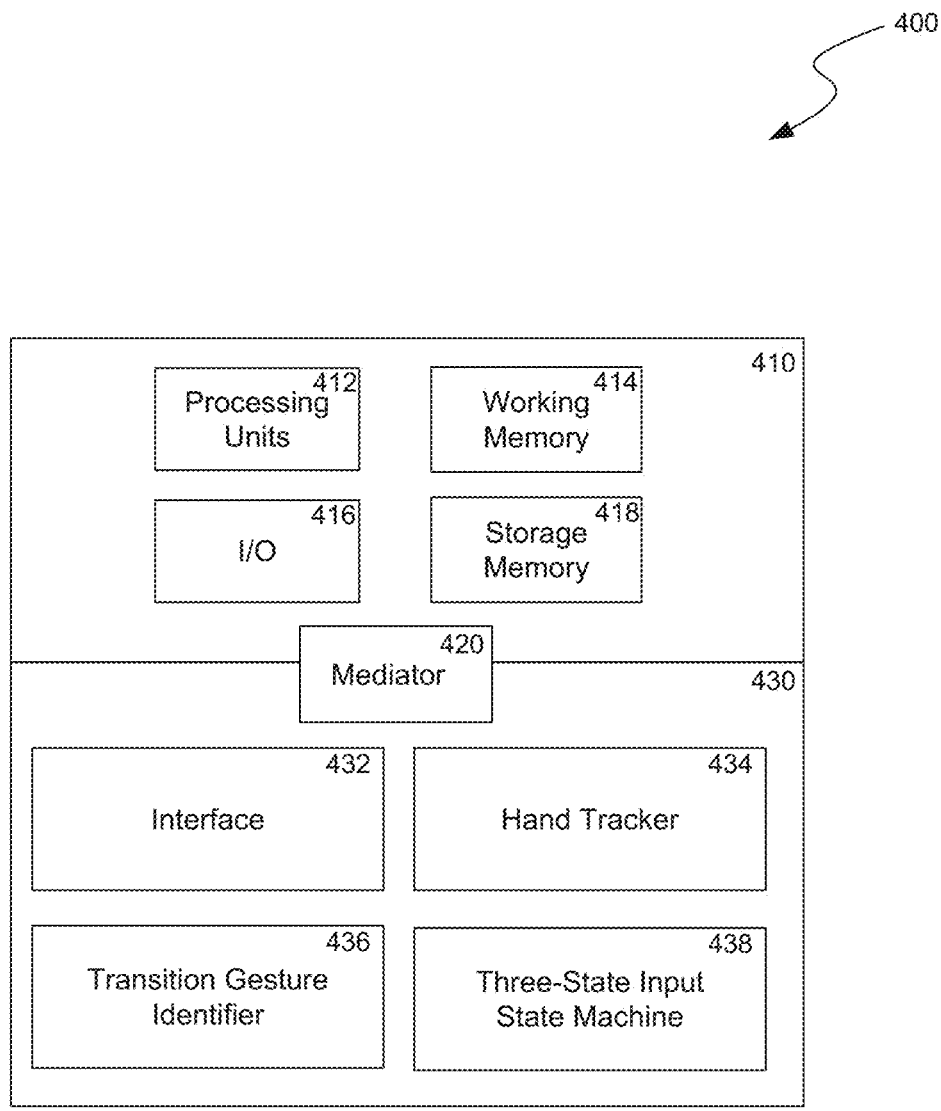
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for interpreting hand postures according to a three-state model, and thus avoiding unintentional interpretations of hand postures as input gestures. Specialized components 430 can include a hand tracker 434, a transition gesture identifier 436, a three-state input state machine 438, and components and APIs which can be used for providing user interfaces, transferring data, and controlling the specialized components, such as interface 432. In some implementations, components 400 can be in a computing system that is distributed across multiple computing devices or can be an interface to a server-based application executing one or more of specialized components 430.

The hand tracker 434 can receive image or other sensor data from various inputs of I/O units 416, such as a camera, glove, bracelet, etc., and can interpret this data to determine hand postures. For example, the hand tracker 434 can generate a 3D model of a hand, a skeletal representation of the hand, relative coordinates or distances for specified points on the hand, etc. Additional details on monitoring hand postures are described below in relation to block 502 of FIG. 5.

The transition gesture identifier 436 can receive hand posture data from hand tracker 434 and can identify whether the hand posture amounts to a gesture to transition out of a current state. Examples of postures that transition gesture identifier 436 can identify as transition gestures are described below in relation to FIGS. 7-11. In some implementations, transition gesture identifier 436 can use a machine learning model to identify whether a hand posture amounts to a transition gesture. In some implementations, instead of receiving hand postures, the machine learning model can directly receive image or sensor data, which it can classify as either being a transition gesture or not. Additional details on identifying transition gestures are described below in relation to block 504 of FIG. 5.

The three-state input state machine 438 can be a state machine with neutral, tracking, and active states, with defined transitions between these states. An example representation of such a state machine is described below in relation to FIG. 6. The three-state input state machine 438 can include an identification of which state is currently activated. The three-state input state machine 438 can also indicate to other components which gestures to monitor for (e.g., which gestures will move to a next or previous state from the current state) and can receive input of identified transition gestures and update the current state identifier according to the defined transitions.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
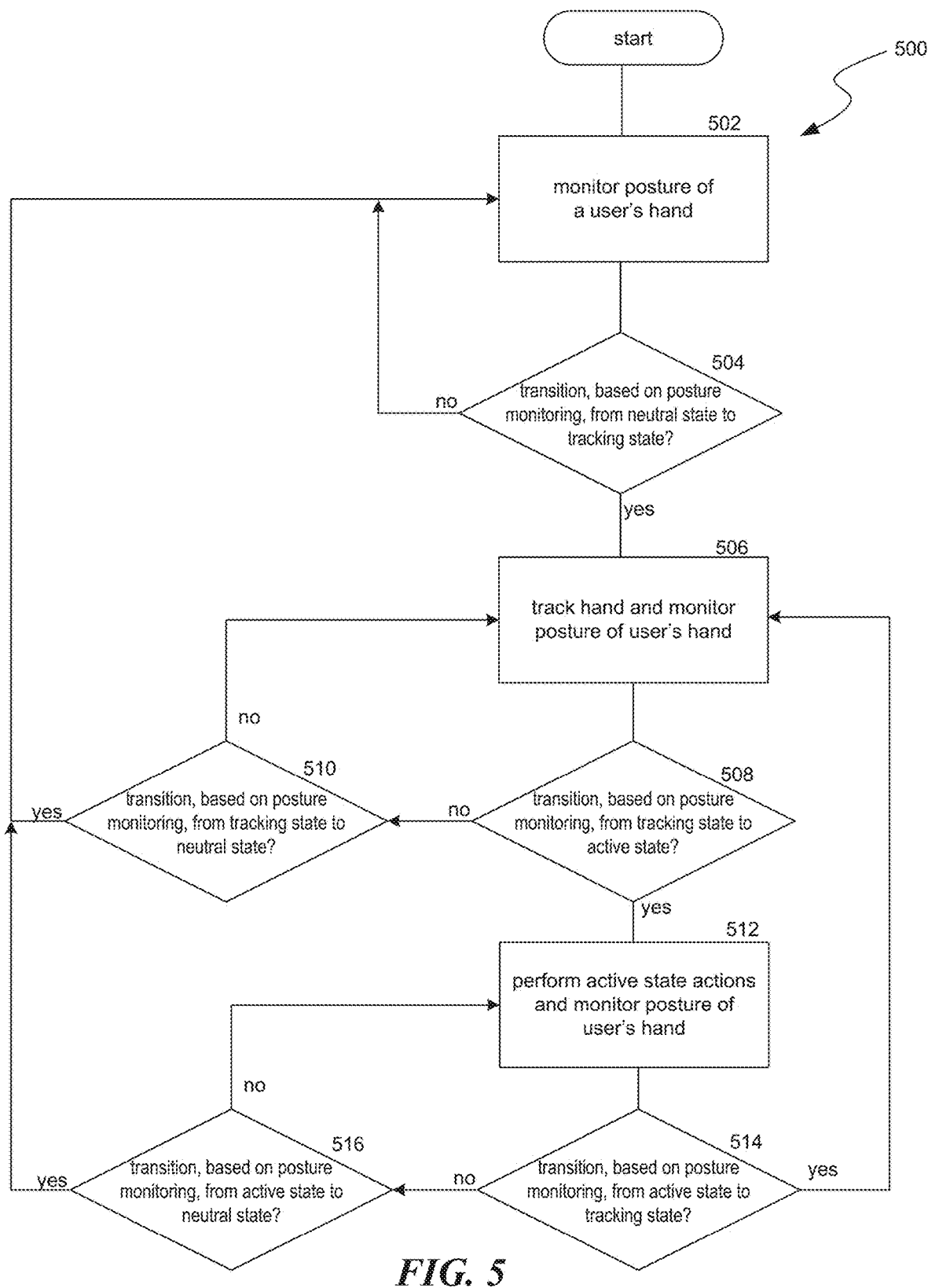
FIG. 5 is a flow diagram illustrating a process used in some implementations of the present technology for transitioning between states of a three-state model.

FIG. 5 is a flow diagram illustrating a process 500 used in some implementations for interpreting hand postures according to a three-state model. The hand interaction system can perform process 500 continuously as it receives identifications of hand postures. In some implementations, an artificial reality system can use different input modalities, such as both controllers and hand gestures, e.g., depending on requirements of a current application. In such cases, the hand interaction system can use process 500 only when the hand input modality is active. In some implementations, the hand interaction system can monitor for different types of hand input(s) in different situations. For example, some very common gestures that should be easily performed, such as a simple point-and-click, can be outside the three-state model, and thus can be performed with a single gesture. However, other gestures, such as the casting of a projection for use in interacting with objects outside the user's reach, can be performed using the three-state model, requiring the user to first cause a transition to the tracking state before activating the projection.

Process 500 begins with a neutral state. The neutral state can correspond to the user making a gesture for a neutral state or to when the user's hand is in any posture where the hand interaction system hasn't identified a transition to the tracking state, as discussed below in more detail in relation to FIGS. 7A, 8A, 9A, 10A, and 11A. At block 502, process 500 can monitor postures of a user's hand. In some implementations, process 500 can do this by receiving input from a camera that captures images of the user's hand and determining, based on the images, a posture such as a 3D model of the hand, a skeletal representation of the hand, relative coordinates or distances for specified points on a hand (e.g., various joints and fingertips), etc. In some implementations, hand postures can be monitored based on other input, such as from sensors in a wearable glove or bracelet, sonar or ultrasound sensors, etc. In some implementations, one or more of the transition gestures can be performed with two hands or by different ones of the user's hands, in which case process 500 can monitor the postures of both of the user's hands or can select which hand to monitor based on the current state and which hand can make gestures to transition from the current state.

At block 504, process 500 can determine whether the postures tracked at block 502 amount to a transition gesture for transitioning from the neutral state to the tracked state. Examples of neutral-to-tracked transition gestures are described below in relation to FIGS. 7B, 8B, 9B, 10B, and 11B.

In some implementations, process 500 can identify a neutral-to-tracked transition gesture using a machine learning model, such as a neural network, trained to take images or posture models and output a determination of whether the input includes a neutral-to-tracked transition gesture. In some implementations, such models can be trained using gestures from a sample set of users instructed to make the transition gesture. In some implementations, such machine learning models can be customized for the current user, e.g., by instructing the user to make the transition gesture one or more times and updating the training of the machine learning model using, as additional training data, the user's gestures following the instructions.

In some implementations, process 500 can use other or additional techniques to identify neutral-to-tracked transition gestures, such as when process 500 has template neutral-to-tracked transition gestures (e.g., as skeleton postures or 3D hand models), and process 500 can compare the user's hand posture to the template. For example, process 500 can adjust sizes of the template or of the posture of the user (e.g., making the palms and fingers the same length), can compute a delta between the user posture and the template (e.g., by using a warping algorithm or determining distances between corresponding parts of the models when overlaid), and then can compare the delta to a threshold to determine if the gesture is a neutral-to-tracked transition gesture.

If process 500 identifies a neutral-to-tracked transition gesture at block 504, it can continue to block 506. Otherwise process 500 can return to block 502 to further monitor hand postures.

At block 506, process 500 is in the tracking state and can further monitor a posture of the user's hand in a manner similar to block 502. In some implementations, at block 506, process 500 can also interpret user gestures according to allowable input for the tracking state. In some implementations, allowable input for the tracking state can be to direct a position of a projection or to select or highlight objects, without actuating controls or otherwise interacting with objects.

At block 508, process 500 can determine whether the postures tracked at block 506 amount to a transition gesture for transitioning from the tracked state to the active state. Examples of tracked-to-active transition gestures are described below in relation to FIGS. 7C, 8C, 9C, 10C, and 11C. Process 500 can identify tracked-to-active transition gestures in a manner similar to how it identifies neutral-to-tracked transition gestures, discussed above in relation to block 504. If process 500 identifies a tracked-to-active transition gesture at block 508, it can continue to block 512. Otherwise process 500 can continue to block 510.

At block 510, process 500 can determine whether the postures tracked at block 506 amount to a transition gesture for transitioning from the tracked state back to the neutral state. In various implementations, such a tracked-to-neutral transition gesture can be simply releasing the gesture identified at block 504 or can be performing a particular return gesture. Process 500 can identify tracked-to-neutral transition gestures in a manner similar to how it identifies neutral-to-tracked transition gestures, discussed above in relation to block 504. If process 500 identifies a tracked-to-neutral transition gesture at block 510, it can return to block 502 to further monitor hand postures.

At block 512, process 500 is in the active state and can further monitor a posture of the user's hand in a manner similar to block 502. At block 512, process 500 can also interpret user gestures for the active state, such as to activate controls, move objects, or for other interactions not available in the neutral or tracking states. In some implementations where one or more objects were selected in the tracking state, the input received at block 512 is interpreted only with respect to the selected object(s). For example, if a user selected an object while in the tracking state at block 506, then made a gesture to transition to active state and clicked on a "rotate 90-degrees" control, the control activation can be interpreted to rotate the selected object.

At block 514, process 500 can determine whether the postures tracked at block 512 amount to a transition gesture for transitioning from the active state to the tracked state. In some implementations, such an active-to-tracked transition gesture can be returning the hand posture to the tracking gesture (e.g., one of the gestures described in relation to FIGS. 7B, 8B, 9B, 10B, or 11B). Process 500 can identify active-to-tracked transition gestures in a manner similar to how it identifies neutral-to-tracked transition gestures, discussed above in relation to block 504. If process 500 identifies an active-to-tracked transition gesture at block 514, it can return to block 506. Otherwise process 500 can continue to block 516.

At block 516, process 500 can determine whether the postures tracked at block 512 amount to a transition gesture for transitioning from the active state back to the neutral state. In various implementations, such an active-to-neutral transition gesture can be simply releasing the gesture identified at block 508 or can be performing a particular return gesture. Process 500 can identify the active-to-neutral transition gestures in a manner similar to how it identifies neutral-to-tracked transition gestures, discussed above in relation to block 504. If process 500 identifies an active-to-neutral transition gesture at block 516, it can return to block 502 to further monitor hand postures. In some implementations, process 500 must first transition to block 506 before returning to block 502. In this case, process 500 does not include block 516 and instead transitions from block 514 back to block 512 on the "no" branch.

Figure 6:
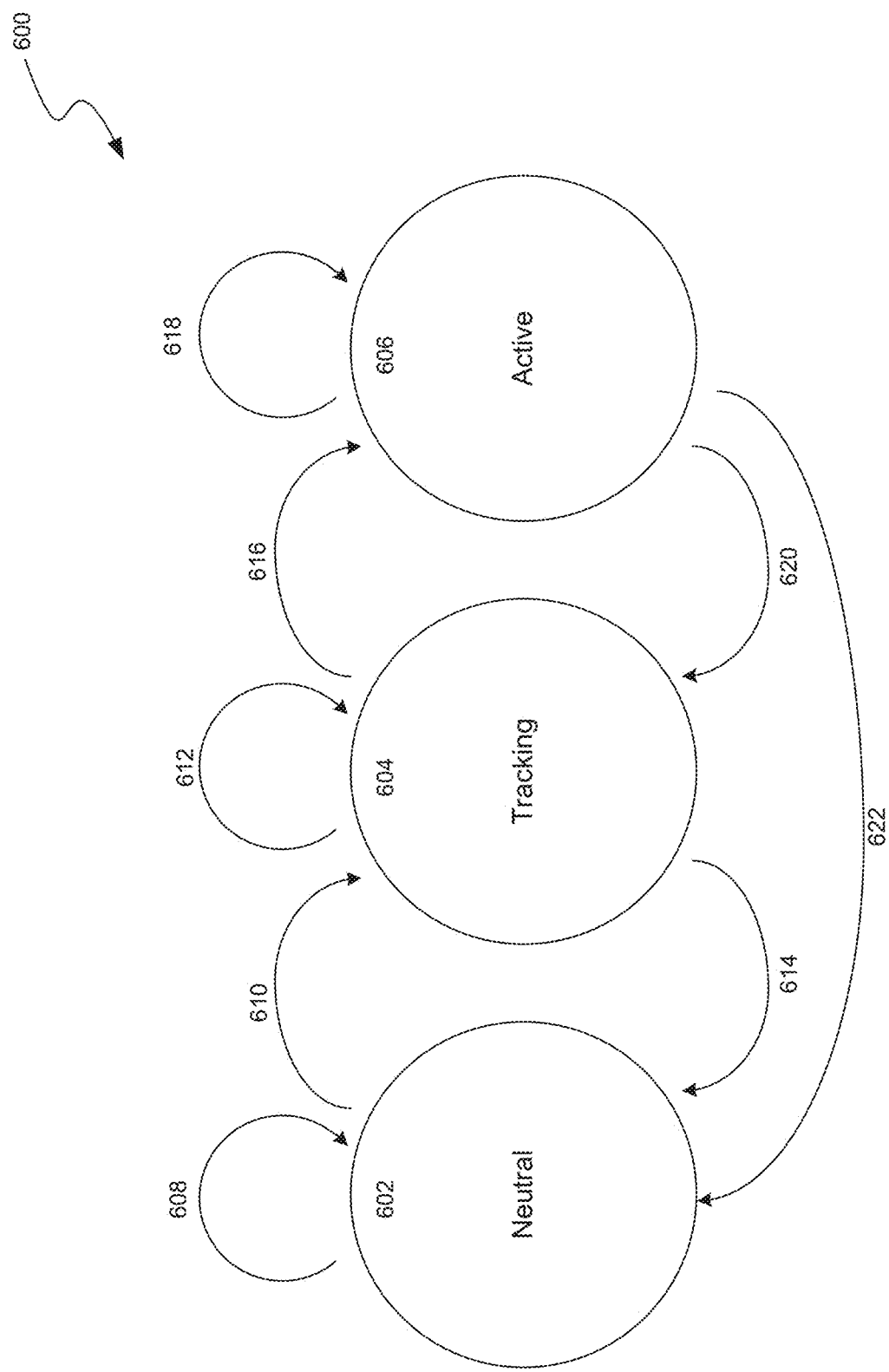
FIG. 6 illustrates a state machine showing a three-state model with state transitions.

FIG. 6 illustrates a state machine 600 showing a three-state model with state transitions. State machine 600 includes a neutral state 602, a tracking state 604, and an active state 606.

In the neutral state 602, the hand interaction system is only monitoring for a neutral-to-tracking transition gesture to take transition 610 to tracking state 604. While the neutral-to-tracking transition gesture is not identified, the state machine 600 stays in neutral state 602 as indicated by loop 608.

In the tracking state 604, the hand interaction system is monitoring for a tracking-to-active transition gesture to take transition 616 to active state 606 and for a tracking-to-neutral transition gesture (e.g., release of the neutral-to-tracking transition gesture identified to make transition 610) to take transition 614 back to neutral state 602. While the tracking-to-neutral and tracking-to-active transition gestures are not identified, the state machine 600 stays in tracking state 604 as indicated by loop 612. In some implementations, while in the tracking state 604, the user can perform a specified set of additional interactions, such as selecting target objects.

In the active state 606, the hand interaction system is monitoring for an active-to-tracking transition gesture (e.g., reforming the gesture that caused transition 610) to take transition 620 back to tracking state 604 and is monitoring for an active-to-neutral transition gesture (e.g., release of the tracking-to-active transition gesture identified to take transition 616) to take transition 622 back to neutral state 602. While the active-to-tracking and active-to-neutral transition gestures are not identified, the state machine 600 stays in active state 606 as indicated by loop 618. While in the active state 606, the user can perform a specified set of active interactions, such as actuating controls, moving objects, etc.

In some implementations, interactions performed from the active state 606 are directed to objects selected while in the tracking state 604.

Figures 7A, 7B, 7C:
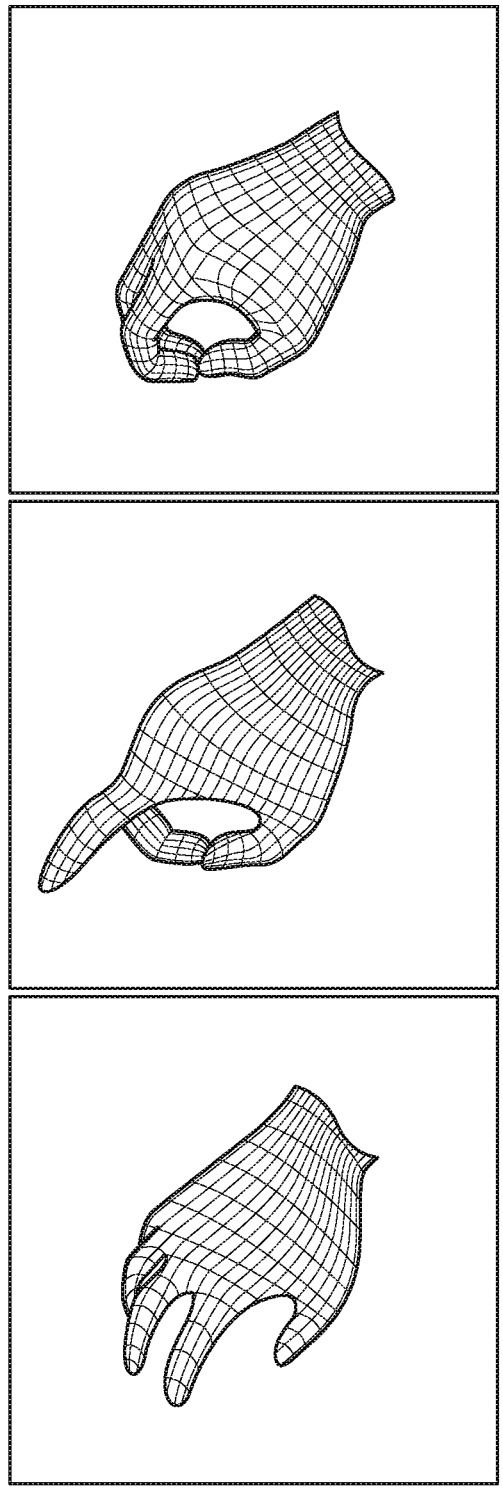
FIGS. 7A-C, 8A-C, 9A-C, 10A-C, and 11A-C are sequences of conceptual diagrams, each sequence illustrating an example set of hand gestures to transition between states in a three-state model.

FIGS. 7A-C are conceptual diagrams illustrating a first example 700 of "Index-Middle Finger Pinch" transition gestures that can be identified to transition between states of a three-state model. FIG. 7A, for example, illustrates a hand in a neutral state. While the neutral state shown in FIG. 7A is a hand posture with the fingers open and the palm facing down, the neutral state can be any posture that is not a gesture to transition to the tracking state. FIG. 7B illustrates a neutral-to-tracking transition gesture where the user makes a "pinch" between her thumb and a first (e.g., middle) finger. FIG. 7C illustrates a tracking-to-active transition gesture where the user makes a double pinch between her thumb, the first (e.g., middle) finger and a second (e.g., index) finger. The "Index-Middle Finger Pinch" gesture combination is beneficial in that it suggests directionality, is intuitive with self-haptic feedback, works well with input modalities that use projection casting and that map fingers to controls, and is stable and precise.

Figures 8A, 8B, 8C:
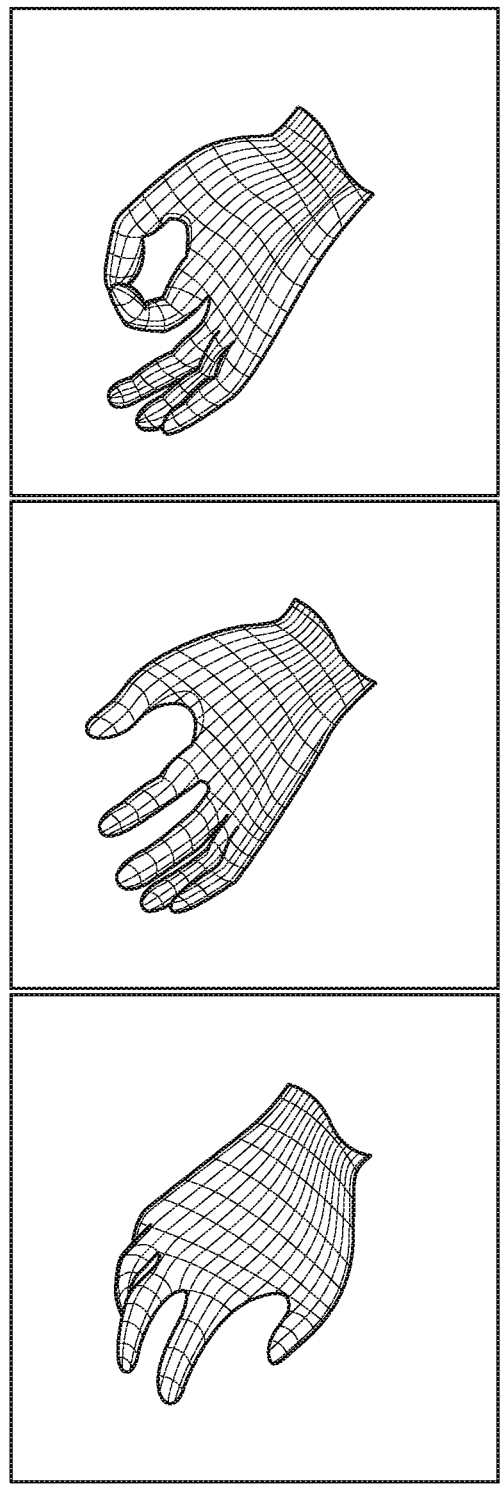

FIGS. 8A-C are conceptual diagrams illustrating a second example 800 of "Palm Up Pinch" transition gestures that can be identified to transition between states of a three-state model. For example, FIG. 8A illustrates a hand in a neutral state. While the neutral state shown in FIG. 8A is a hand posture with the fingers open and the palm facing down, the neutral state can be any posture that is not a gesture to transition to the tracking state. FIG. 8B illustrates a neutral-to-tracking transition gesture where the user positions her hand with the palm facing up and her fingers in an extended, relaxed position. FIG. 8C illustrates a tracking-to-active transition gesture where the user positions her hand with the palm facing up and her thumb and one finger (e.g., index finger) forming a pinch gesture. The "Palm Up Pinch" gesture combination provides particularly strong and intuitive separation between the neutral and tracking states.

Figures 9A, 9B, 9C:
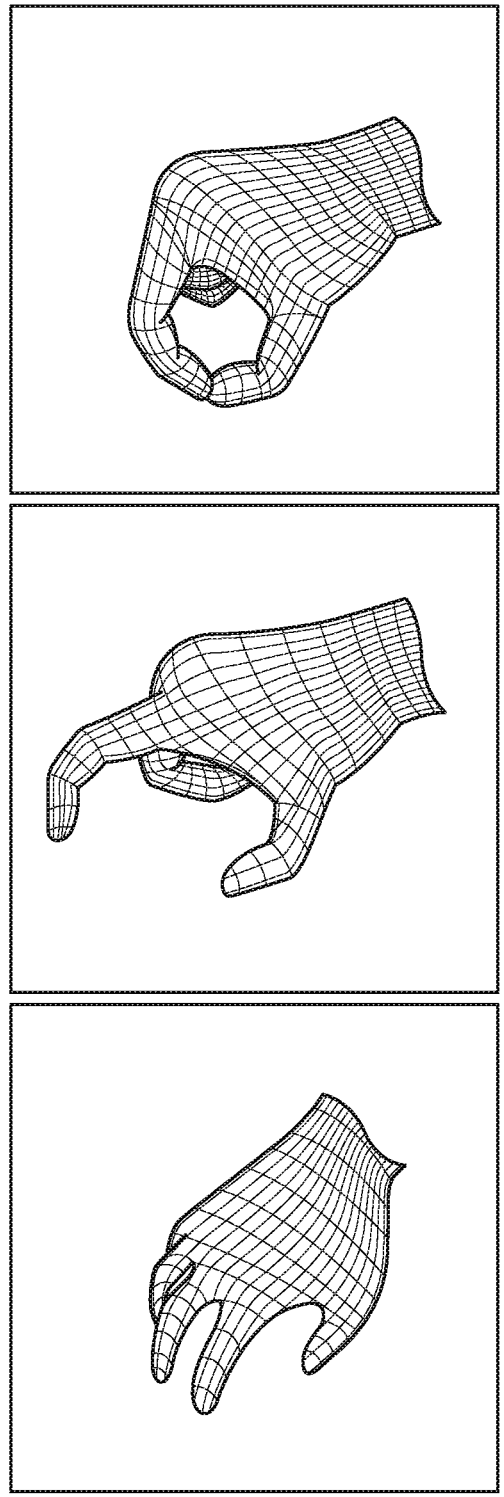

FIGS. 9A-C are conceptual diagrams illustrating a third example 900 of "Proximity Pinch" transition gestures that can be identified to transition between states of a three-state model. FIG. 9A, for example, illustrates a hand in a neutral state. While the neutral state shown in FIG. 9A is a hand posture with the fingers open and the palm facing down, the neutral state can be any posture that is not a gesture to transition to the tracking state. FIG. 9B illustrates a neutral-to-tracking transition gesture where the user makes an open pinch gesture where the tip of her thumb and the tip of a designated finger (e.g., index finger) are spaced apart by at least a threshold amount. FIG. 9C illustrates a tracking-to-active transition gesture where the user makes a pinch bringing the tip of her thumb and the tip of her designated finger together. The "Proximity Pinch" gesture combination is highly intuitive, provides consistency between direct interactions where target objects are within a user's reach and indirect interactions where the target objects are out of the user's reach, provides self-haptic feedback, and is stable and precise.

Figures 10A, 10B, 10C:
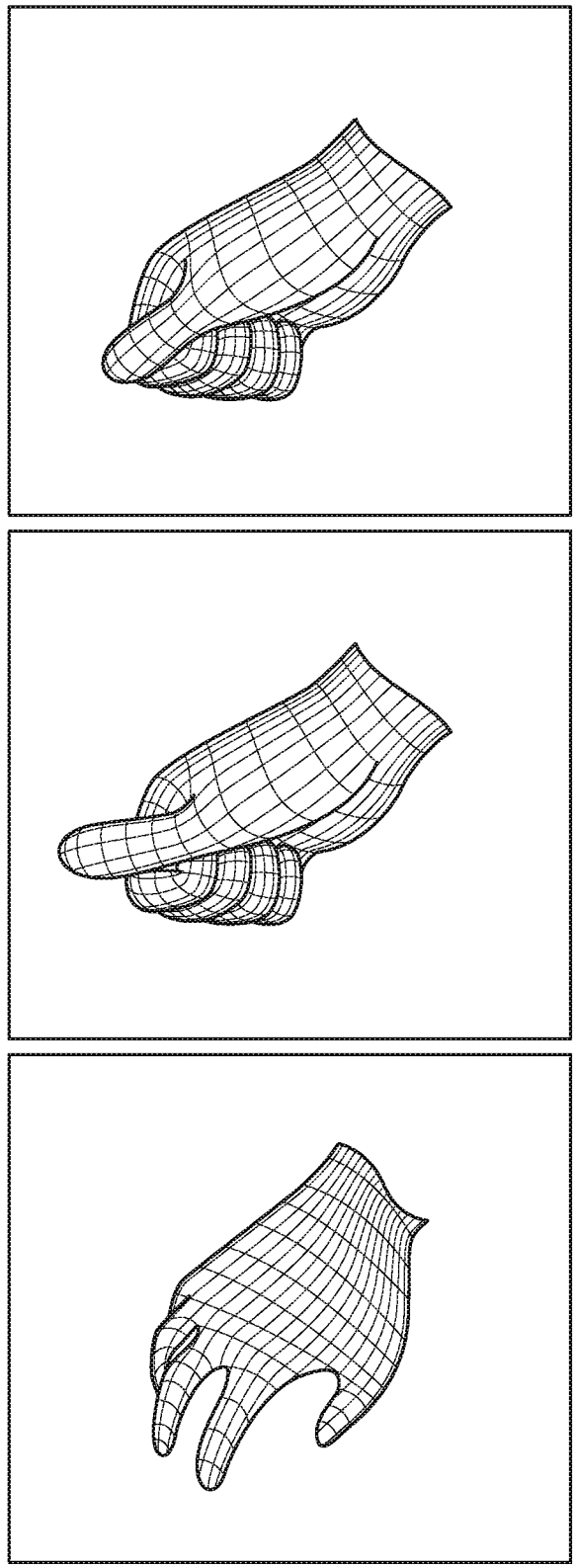

FIGS. 10A-C are conceptual diagrams illustrating a fourth example 1000 of "Fist Click" transition gestures that can be identified to transition between states of a three-state model. FIG. 10A illustrates a hand in a neutral state. While the neutral state shown in FIG. 10A is a hand posture with the fingers open and the palm facing down, the neutral state can be any posture that is not a gesture to transition to the tracking state. FIG. 10B illustrates a neutral-to-tracking transition gesture where the user makes a first with the tip of her thumb away from her curled index finger. FIG. 10C illustrates a tracking-to-active transition gesture where the user makes a first with the tip of her thumb touching her curled index finger. The first click gesture combination has low complexity, which translates to lower cognitive load than some other gesture combinations. This allows the user to pay closer attention to the UI, anticipating how to target a next object as opposed to closely attending to activation of a current one. The first click gesture combination is intuitive, easy to learn, and easily expandable to perform additional gestures with fingers other than the thumb while holding the transition gestures (e.g., micro-gestures described below).

Figures 11A, 11B, 11C:
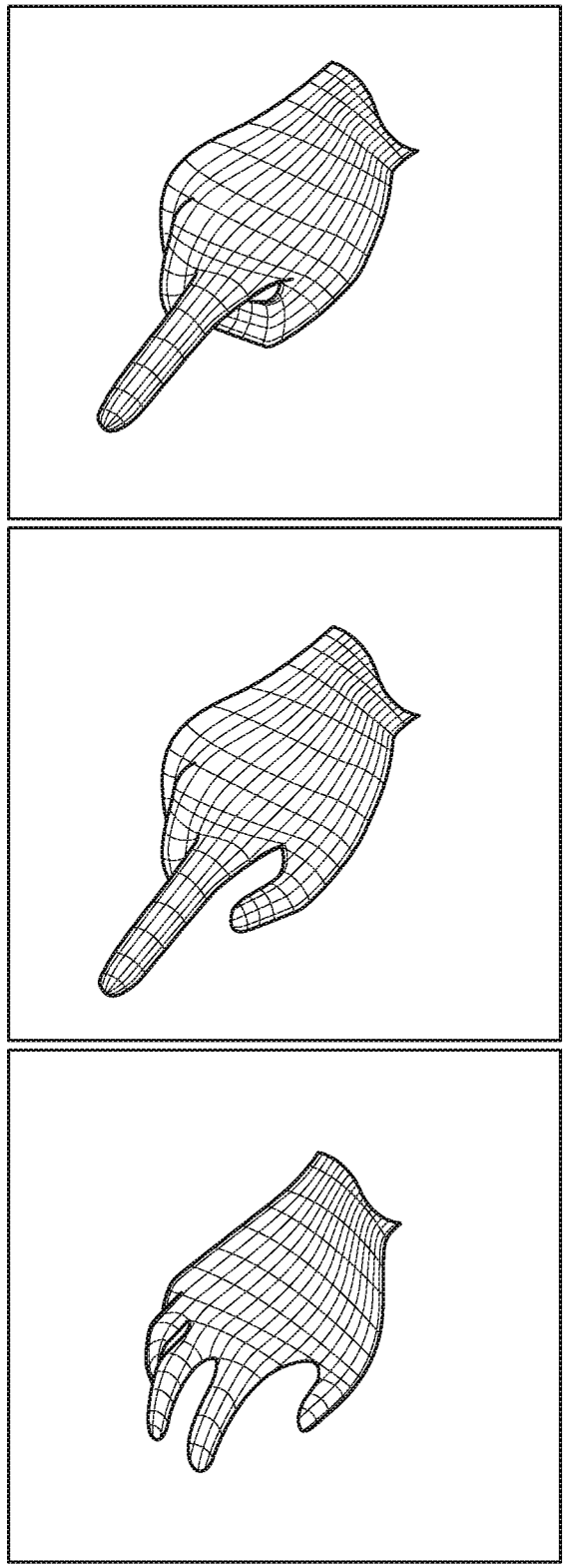

FIGS. 11A-C are conceptual diagrams illustrating a fifth example 1100 of "Point Click" transition gestures that can be identified to transition between states of a three-state model. FIG. 11A illustrates a hand in a neutral state. While the neutral state shown in FIG. 11A is a hand posture with the fingers open and the palm facing down, the neutral state can be any posture that is not a gesture to transition to the tracking state. FIG. 11B illustrates a neutral-to-tracking transition gesture where the user curls all of her fingers except her thumb and one other pointing finger (e.g., index finger) toward her palm. FIG. 11C illustrates a tracking-to-active transition gesture where the user curls all of her fingers except her pointing finger (this time including her thumb) toward her palm. The "Point Click" gesture combination is beneficial in that it suggests directionality, provides self-haptic feedback, and is stable and precise.

In some implementations, a state transition gesture can be paired with one or more "micro-gestures," which can provide additional functionality in the state reached by performing the transition gesture. Examples of micro-gestures include rotating a hand, curling or extending a finger not involved in the transition gesture, curling or extending a wrist, bringing together two or more fingers, or otherwise moving one or more fingers.

As a more specific example for the palm up pinch set of gestures, e.g., the gesture shown in FIG. 8B, each of three virtual objects can be mapped to one of the three pinky, ring, and middle fingers (i.e., the fingers not used in the tracking-to-active gesture shown in FIG. 8C). While in the tracking state, curling any of these fingers selects the corresponding object. Further, for the gesture shown in FIG. 8C; once the active state has been entered, each of three controls that can act on selected objects can be mapped to one of the three pinky, ring, and middle fingers, and, while in the tracking state, curling any of these fingers actuates the corresponding control.

As another specific example for the fist-click set of gestures, while in the active state with the user is holding the gesture shown in FIG. 10C, the user can move her thumb around on her index finger while keeping contact between her thumb and index finger. The hand interaction system can interpret this movement as it would input from a thumb joystick. Additionally or alternatively, other control actuations could be mapped to the curling or extension of any of the user's four non-thumb fingers.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, a "finger" can be any of the five digits of a hand and a fingertip can be a tip of any of the five fingers of a hand.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method, performed by a computing system, for interpreting hand gestures, in an artificial reality environment, according to a three-state model, the method comprising:
 identifying that a tracked one or more hand postures matches a first transition gesture and in response:
  performing a first transition from a neutral state to a tracking state,
  wherein identifying the first transition comprises identifying a neutral-to-tracking transition gesture from an index-middle finger pinch set of gestures, a palm up pinch set of gestures, a proximity pinch set of gestures, a first click set of gestures, or a point click set of gestures;

receiving a first user action input;

identifying, based on being in the tracking state, that the first user action input is a selection of one or more target objects;

after the selection of the one or more target objects:
identifying that the tracked one or more hand postures matches a second transition gesture and in response:
performing a second transition from the tracking state to an active state,
wherein identifying the second transition comprises identifying a tracking-to-active transition gesture from the set of gestures from which the neutral-to-tracking transition gesture was identified;

receiving a second user action input; and identifying, based on being in the active state, that the second user action input is an action that is with respect to the one or more target objects.

2. The method of claim 1 wherein,
a set of gestures is divided into a first section corresponding to the tracking state and a second section corresponding to the active state;
the computing system does not attempt to identify any of the set of gestures, other than a gesture to trigger the first transition, while in the neutral state;
the computing system does not attempt to identify any of the set of gestures in the second section while in the tracking state; and
the computing system does not attempt to identify any of the set of gestures in the first section while in the active state.

3. The method of claim 1, wherein:
the computing system attempts, while in the neutral state, to only interpret gestures, other than gestures for transitioning between states, as actions that can be taken while in the neutral state; and
the computing system attempts, while in the tracking state, to only interpret gestures, other than gestures for transitioning between states, as actions that can be taken while in the tracking state.

4. The method of claim 1, further comprising:
identifying that the tracked one or more hand postures matches a third transition gesture and in response:
performing a third transition from the active state to the neutral state,
wherein the third transition is that the user released a gesture.

5. The method of claim 1, further comprising:
identifying that the tracked one or more hand postures matches a third transition gesture and in response:
performing a third transition from the active state to the neutral state; and
in response to the third transition, deselecting the one or more target objects.

6. The method of claim 1, wherein the neutral-to-tracking transition gesture and the tracking-to-active transition gestures are from the index-middle finger pinch set of gestures.

7. The method of claim 1, wherein the neutral-to-tracking transition gesture and the tracking-to-active transition gestures are from the palm up pinch set of gestures.

8. The method of claim 1, wherein the neutral-to-tracking transition gesture and the tracking-to-active transition gestures are from the proximity pinch set of gestures.

9. The method of claim 1, wherein the neutral-to-tracking transition gesture and the tracking-to-active transition gestures are from the first click set of gestures.

10. The method of claim 1, wherein the neutral-to-tracking transition gesture and the tracking-to-active transition gestures are from the point click set of gestures.

11. A non-transitory computer-readable storage medium storing instructions that, when executed by a computing system, cause the computing system to perform operations for interpreting hand gestures, in an artificial reality environment, according to a three-state model, the operations comprising:
tracking, by the computing system, one or more hand postures;
identifying that the tracked one or more hand postures matches a first transition gesture and in response:
performing a first transition from a neutral state to a tracking state;
receiving a first user action input;
identifying, based on being in the tracking state, that the first user action input is a selection of one or more target objects;
after the selection of the one or more target objects:
identifying that the tracked one or more hand postures matches a second transition gesture and in response:
performing a second transition from the tracking state to an active state;
receiving a second user action input; and
identifying, based on being in the active state, that the second user action input is an action that is with respect to the one or more target objects.

12. The non-transitory computer-readable storage medium of claim 11, wherein:
a set of gestures is divided into a first section corresponding to the tracking state and a second section corresponding to the active state;
the computing system does not attempt to identify any of the set of gestures, other than a gesture to trigger the first transition, while in the neutral state;
the computing system does not attempt to identify any of the set of gestures in the second section, while in the tracking state; and
the computing system does not attempt to identify any of the set of gestures in the first section, while in the active state.

13. The non-transitory computer-readable storage medium of claim 11, wherein:
the computing system does not attempt, while in the neutral state, to identify gestures, other than gestures for transitioning between states, corresponding to actions that can only be taken while in the tracking state or active state; and
the computing system does not attempt, while in the tracking state, to identify gestures, other than gestures for transitioning between states, corresponding to actions that can only be taken while in the active state.

14. The non-transitory computer-readable storage medium of claim 11 further comprising:
identifying that the tracked one or more hand postures matches a third transition gesture and in response:
performing a third transition from the active state to the neutral state,
wherein identifying that the tracked one or more hand postures matches the third transition gesture comprises identifying that the user released a gesture; and in response to the third transition, deselecting the one or more target objects.

15. The non-transitory computer-readable storage medium of claim 11, wherein the tracked one or more hand postures, that matches the first transition gesture as the basis for the first transition from the neutral state to the tracking state, comprises a gesture where the user makes a first with a tip of a thumb away from a curled index finger of the first and the tracked one or more hand postures, that matches the second transition gesture as the basis for the second transition from the tracking state to the active state, comprises a gesture where the tip of the thumb touches the curled index finger on the fist.

16. The non-transitory computer-readable storage medium of claim 11, wherein:
   the tracked one or more hand postures, that matches the first transition gesture as the basis for the first transition from the neutral state to the tracking state, comprises a gesture where the user makes a pinch between a thumb and a middle finger and the tracked one or more hand postures, that matches the second transition gesture as the basis for the second transition from the tracking state to the active state, comprises a gesture where the user makes a double pinch between the thumb, the middle finger, and an index finger; or
   the tracked one or more hand postures, that matches the first transition gesture as the basis for the first transition from the neutral state to the tracking state, comprises a gesture where the user positions a hand with the palm facing up, with the fingers of the hand extended and the tracked one or more hand postures, that matches the second transition gesture as the basis for the second transition from the tracking state to the active state, comprises a gesture where the palm is facing up, and a thumb and one finger of the hand come together to form a pinch.

17. The non-transitory computer-readable storage medium of claim 11, wherein:
   the tracked one or more hand postures, that matches the first transition gesture as the basis for the first transition from the neutral state to the tracking state, comprises a gesture where the user makes an open pinch gesture where the tip of a thumb and the tip of a an index finger are spaced apart by at least a threshold amount and the tracked one or more hand postures, that matches the second transition gesture as the basis for the second transition from the tracking state to the active state, comprises a gesture where the user makes a pinch bringing the tip of the thumb and the tip of the index finger together; or
   the tracked one or more hand postures, that matches the first transition gesture as the basis for the first transition from the neutral state to the tracking state, comprises a gesture where the user curls three fingers of a hand, excepting a thumb and index finger, toward a palm of the hand and the tracked one or more hand postures, that matches the second transition gesture as the basis for the second transition from the tracking state to the active state, comprises a gesture where the user curls four fingers of the hand, excepting the index finger, toward the palm.

18. A computing system for interpreting hand gestures, in an artificial reality environment, according to a three-state model, the computing system comprising:
   one or more processors; and
   a memory storing instructions that, when executed by the one or more processors, cause the computing system to perform operations comprising:
      tracking one or more hand postures;
      identifying that the tracked one or more hand postures matches a first transition gesture and in response:
         performing a first transition from a neutral state to a tracking state;
      receiving a first user action input;
      identifying, based on being in the tracking state, that the first user action input is a selection of one or more target objects;
      after the selection of the one or more target objects:
         identifying that the tracked one or more hand postures matches a second transition gesture and in response:
            performing a second transition from the tracking state to an active state;
      receiving a second user action input; and
      identifying, based on being in the active state, that the second user action input is an action that is with respect to the one or more target objects.

19. The computing system of claim 18, wherein:
   the tracked one or more hand postures, that matches the first transition gesture as the basis for the first transition from the neutral state to the tracking state, comprises a gesture where the user makes a first with a tip of a thumb away from a curled index finger of the fist;
   the tracked one or more hand postures, that matches the second transition gesture as the basis for the second transition from the tracking state to the active state, comprises a gesture where the tip of the thumb touches the curled index finger on the fist; and
   the identifying that the second user action input is an action that is with respect to the one or more target objects is performed in part by identifying movement of a thumb of a user while the thumb of the user it is in contact with a curled index finger of the user.

20. The computing system of claim 18, wherein:
   the computing system attempts, while in the neutral state, to only interpret gestures, other than gestures for transitioning between states, as actions that can be taken while in the neutral state; and
   the computing system attempts, while in the tracking state, to only interpret gestures, other than gestures for transitioning between states, as actions that can be taken while in the tracking state.

* * * * *